(12) United States Patent
Dreyer

(10) Patent No.: US 11,370,478 B2
(45) Date of Patent: Jun. 28, 2022

(54) STEERING SYSTEM FOR A TRANSPORTATION VEHICLE

(71) Applicant: VOLKSWAGEN AKTIENGESELLSCHAFT, Wolfsburg (DE)

(72) Inventor: Dirk Dreyer, Stadthagen (DE)

(73) Assignee: Volkswagen Aktiengesellschaft

( * ) Notice: Subject to any disclaimer, the term of this patent is extended or adjusted under 35 U.S.C. 154(b) by 224 days.

(21) Appl. No.: 16/640,374

(22) PCT Filed: Aug. 2, 2018

(86) PCT No.: PCT/EP2018/070925
§ 371 (c)(1),
(2) Date: Feb. 20, 2020

(87) PCT Pub. No.: WO2019/038044
PCT Pub. Date: Feb. 28, 2019

(65) Prior Publication Data
US 2021/0070353 A1    Mar. 11, 2021

(30) Foreign Application Priority Data
Aug. 23, 2017   (DE) ............... 10 2017 214 717.2

(51) Int. Cl.
*B62D 5/04*      (2006.01)
*H02K 11/20*    (2016.01)

(52) U.S. Cl.
CPC .......... *B62D 5/0481* (2013.01); *H02K 11/20* (2016.01)

(58) Field of Classification Search
None
See application file for complete search history.

(56) References Cited

U.S. PATENT DOCUMENTS

| | | | |
|---|---|---|---|
| 9,020,703 B2 * | 4/2015 | Bhae .................... | B62D 5/0481 180/443 |
| 9,255,857 B2 * | 2/2016 | Hotta .................... | B62D 5/0481 |
| 10,411,552 B2 * | 9/2019 | Yamasaki ............ | B62D 5/0403 |
| 10,654,517 B2 * | 5/2020 | Fujimoto ............. | H02K 11/215 |
| 10,668,943 B2 * | 6/2020 | Fujimoto ............. | H02K 11/33 |

(Continued)

FOREIGN PATENT DOCUMENTS

| | | | | |
|---|---|---|---|---|
| CN | 109641614 A | * | 4/2019 | ............. B62D 5/046 |
| CN | 109641614 B | * | 6/2021 | ............. B62D 5/046 |

(Continued)

OTHER PUBLICATIONS

Search Report for International Patent Application No. PCT/EP2018/070925; dated Nov. 14, 2018.

*Primary Examiner* — Kevin R Steckbauer
(74) *Attorney, Agent, or Firm* — Barnes & Thornburg, LLP

(57) ABSTRACT

A drive part, in particular, a steering system for a transportation vehicle, having an electric motor and at least one control device, wherein the electric motor has at least one winding, wherein the winding has connection points for a power electronics system of the at least one control device, wherein the drive component has at least one sensor system for detecting fluid, wherein the sensor system has an evaluation and control unit connected to the connection points of the at least one winding, wherein the evaluation and control unit generates a test signal and detects a change in impedance.

4 Claims, 1 Drawing Sheet

(56) References Cited

U.S. PATENT DOCUMENTS

| | | | |
|---|---|---|---|
| 10,668,944 B2* | 6/2020 | Fujimoto | B62D 5/0406 |
| 11,027,769 B2* | 6/2021 | Sato | B62D 3/08 |
| 11,040,738 B2* | 6/2021 | Fujimoto | B62D 5/0406 |
| 11,052,841 B2* | 7/2021 | Fujimoto | H02K 11/33 |
| 2011/0217573 A1* | 9/2011 | Kritzer | H01M 10/484 |
| | | | 429/61 |
| 2013/0138299 A1* | 5/2013 | Bhae | B62D 5/0484 |
| | | | 701/42 |
| 2015/0033877 A1* | 2/2015 | Hotta | B62D 5/0481 |
| | | | 73/862.193 |
| 2016/0181885 A1* | 6/2016 | Yamasaki | H02K 5/10 |
| | | | 180/443 |
| 2018/0029636 A1* | 2/2018 | Sworowski | B62D 5/0481 |
| 2018/0178739 A1* | 6/2018 | Fujimoto | B62D 5/0406 |
| 2018/0178829 A1* | 6/2018 | Fujimoto | H02K 11/30 |
| 2018/0244301 A1* | 8/2018 | Fujimoto | H02K 11/33 |
| 2019/0016374 A1* | 1/2019 | Fujimoto | B62D 5/0481 |
| 2019/0023305 A1* | 1/2019 | Fujimoto | B62D 5/0406 |
| 2019/0176872 A1* | 6/2019 | Sato | B62D 5/0481 |
| 2019/0193780 A1* | 6/2019 | Rácz | B62D 5/046 |
| 2019/0248408 A1* | 8/2019 | Boda | B62D 5/0487 |
| 2020/0239065 A1* | 7/2020 | Fujimoto | H02K 9/227 |
| 2021/0001918 A1* | 1/2021 | Asao | H02K 5/12 |
| 2021/0070353 A1* | 3/2021 | Dreyer | H02K 11/20 |
| 2021/0111610 A1* | 4/2021 | Cooper | H02K 11/26 |
| 2021/0237794 A1* | 8/2021 | Onishi | B62D 5/04 |

FOREIGN PATENT DOCUMENTS

| | | | | |
|---|---|---|---|---|
| CN | 109661341 B | * | 11/2021 | B62D 5/04 |
| DE | 2801358 A1 | | 7/1979 | |
| DE | 3629137 A1 | | 3/1988 | |
| DE | 102006051799 A1 | | 5/2008 | |
| DE | 102008005843 A1 | | 8/2009 | |
| DE | 102010001116 A1 | * | 7/2011 | G01F 23/266 |
| DE | 102010001116 A1 | | 7/2011 | |
| DE | 102015102228 A1 | | 8/2016 | |
| DE | 102015105609 A1 | | 10/2016 | |
| EP | 0426152 A1 | | 5/1991 | |
| EP | 2365575 A1 | | 9/2011 | |
| EP | 3507169 B1 | * | 9/2021 | B62D 5/04 |
| JP | 2007006608 A | * | 1/2007 | H02K 11/20 |
| JP | 4783069 B2 | * | 9/2011 | H02K 11/20 |
| WO | WO-2018036615 A1 | * | 3/2018 | B62D 5/046 |
| WO | WO-2018041331 A1 | * | 3/2018 | B62D 5/04 |

* cited by examiner

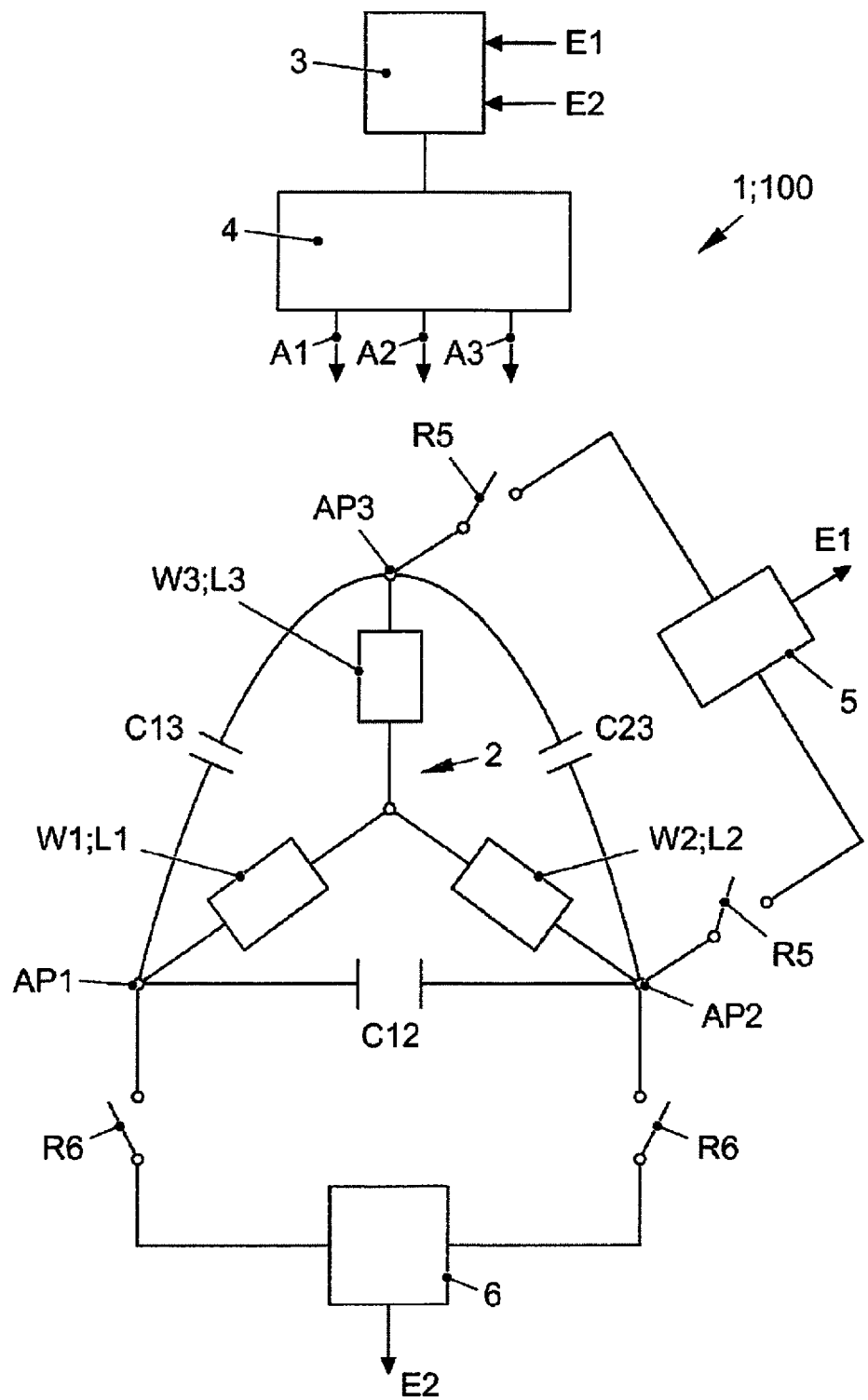

STEERING SYSTEM FOR A TRANSPORTATION VEHICLE

PRIORITY CLAIM

This patent application is a U.S. National Phase of International Patent Application No. PCT/EP2018/070925, filed 2 Aug. 2018, which claims priority to German Patent Application No. 10 2017 214 717.2, filed 23 Aug. 2017, the disclosures of which are incorporated herein by reference in their entireties.

SUMMARY

Illustrative embodiments relate to a drive component, in particular, to a steering system for a transportation vehicle.

BRIEF DESCRIPTION OF THE DRAWINGS

Disclosed embodiments will be explained below in more detail with reference to the single FIGURE, in which:

FIG. 1 shows a schematic partial illustration of a steering system of a transportation vehicle.

DETAILED DESCRIPTION

A large number of modern steering systems for transportation vehicles have an electric motor which applies at least part of the steering force. In the case of transportation vehicles which travel in a fully automated state, the steering system even provides the entire steering force. Depending on the application, steering systems have to have a fallback level or be embodied in an at least partially redundant state. A problem of steering systems is an ingress of fluid, in particular, water. This fluid can penetrate, for example, via the electric motor and then give rise to a failure of a control device or of its power electronic system.

DE 10 2015 105 609 A1 discloses a sensor for installation in the interior of a drive component, in particular, of an electric motor transmission combination, having a conductor track for forming a capacitance and an insulating material which receives the conductor track, wherein the conductor track is arranged on a detector side of the sensor, which sensor, in the installed state, at least partially bounds an interior space of the drive component. The ingressing fluid can be detected by the sensor, since the capacitance changes as a function of the ingressing fluid.

Disclosed embodiments provide a drive component having a simplified sensor system for detecting fluid.

The drive component comprises an electric motor and at least one control device, wherein the electric motor has at least one winding, wherein the winding has connection points for a power electronics system of the at least one control device, wherein the drive component has at least one sensor system for detecting fluid, wherein the sensor system has an evaluation and control unit which is connected to the connection points of the at least one winding, wherein the evaluation and control unit is designed to generate a test signal and to detect a change in impedance. This eliminates the need for a separate sensor element, wherein the sensor element is formed by the at least one winding which is present in any case and a parasitic capacitance between the connection points, wherein a change in the capacitance is detected by ingressing fluid and therefore the resulting impedance. A field of application is a steering system for a transportation vehicle.

In at least one disclosed embodiment, the test signal is an excitation frequency of an oscillatory circuit which is formed by the at least one winding and at least one parasitic capacitance between the connection points of the at least one winding under defined conditions. For example, the parasitic capacitance is determined in the dried state, and wherein a resonance frequency for the oscillatory circuit is then set. If the oscillatory circuit is then excited and the evaluation and control unit registers an oscillation, no fluid has penetrated. If, on the other hand, no shielding is determined, this indicates ingressed fluid. The benefit over a pure change in impedance is the higher level of sensitivity.

In a further disclosed embodiment, the electric motor has at least three windings, wherein the drive component has at least two sensor systems, wherein the respective evaluation and control units are arranged at different connection points of the windings. In addition to redundancy, different ranges are also investigated for fluid in this way. If the full redundancy does not play such a large role, there can also be provision that the two sensor systems have a common evaluation and control unit which then alternately actuates the two impedances or oscillatory circuits. The at least three windings may be arranged in a star connection. In this context it is to be noted that in principle the electric motor can also have just two windings.

In a further disclosed embodiment, the evaluation and control unit is embodied in such a way that it can be selectively connected to the connection points or disconnected therefrom, wherein this is optionally done via relays. The evaluation and control unit can therefore be protected against high operating currents. The evaluation and control unit can be a completely separate unit here, but can also be integrated into the control device.

In a further disclosed embodiment, the evaluation and control unit is designed to connect to the connection points before the start of the journey. If ingressing fluid is then detected, a warning message can be generated and/or the activation can be prevented. The benefit of a measurement before the start of a journey is that the measurement is not adversely affected by rotating parts (e.g., of the rotor).

At least one field of application is a steering system for a transportation vehicle which travels in a fully automated or partially automated state.

FIG. 1 illustrates part of a steering system 1 as a drive component 100, wherein the steering system 1 has an electric motor 2, three windings W1, W2, W3 of the rotor of which are illustrated, which windings W1, W2, W3 each have an inductance L1-L3. The three windings W1-W3 are connected to a star point S in a star connection. Each winding W has a connection point AP1-AP3. Parasitic capacitances C12, C13 and C23 are formed between the windings W1-W3, the value of the capacitances C12, C13 and C23 being dependent on an ingressing fluid, since the latter acts as a dielectric. Furthermore, the steering system 1 has at least one control device 3 and a power electronic system 4, wherein the power electronic system 4 has three outputs A1-A3 which are connected to the corresponding connection points AP1-AP3. Furthermore, the steering system 1 has a first evaluation and control unit 5 and a second evaluation and control unit 6 which can be selectively connected to the connection points AP1-AP3 via relays R5 and R6, respectively.

In looking then from the connection points AP3 and AP2 or from the connection points AP1 and AP2 as connection terminals in each case into the network, a complex LC network with a resonance frequency is then formed. If symmetry of the inductances L1-L3 and of the parasitic capacitances C12, C23 and C13 is assumed, the two resonance frequencies are the same here. The resonance frequency can, for example, be determined empirically here under defined conditions, or else can be calculated given knowledge of the parasitic capacitances C12, C23 and C13.

Before the start of a journey, the first evaluation and control unit 5 or the control unit 3 then closes the relays 5 and the evaluation and control unit 5 generates a test signal, such as an excitation frequency, for the oscillatory circuit taking into account the parasitic capacitances C13, C12 and C23 in the dry state. If the evaluation and control unit 5 then detects an oscillation, this is a sign of no fluid. If, on the other hand, no oscillation is detected, this indicates ingressed fluid. Subsequently, the relays R5 can be opened, and the relays R6 can be closed, and the measurement can be repeated. The events E1, E2 are then communicated to the control device 3 which, when a fluid is detected, then outputs a warning and/or prevents the activation of the steering system 1.

The invention claimed is:

1. A drive part for a transportation vehicle, the drive part comprising:
    an electric motor;
    at least one control device, wherein the electric motor has a first winding, a second winding, and a third winding each connected to a single star connection point, wherein the first winding has a first connection point opposite the star connection point, the second winding has a second connection point opposite the star connection point, and the third winding has a third connection point opposite the star connection point, each of the first, second, and third connection points being for a power electronics system of the at least one control device; and
    a first sensor system and a second sensor system for detecting fluid, wherein the first sensor system has a first evaluation and control unit only connected to the first connection point and to the second connection point, wherein the second sensor system has a second evaluation and control unit separate from the first evaluation and control unit only connected to the second connection point and the third connection point,
    wherein at least one of the first and second evaluation and control units generate a test signal and detects a change in impedance,
    wherein the test signal is an excitation frequency of an oscillatory circuit formed by at least one of the first, second, and third windings and at least one parasitic capacitance between the first, second, and third connection points of the first, second, and third windings under defined conditions,
    wherein the first and second evaluation and control units are configured to selectively connect to the first, second, and third connection points or disconnect therefrom, and
    wherein the first and second evaluation and control units are connected to the first and second connection points via relays.

2. The drive part of claim 1, wherein the evaluation and control unit connects to the connection points before a start of a journey.

3. The drive part of claim 1, wherein the drive part is a steering system for the transportation vehicle travelling in a fully automated or partially automated state.

4. A drive part for a transportation vehicle, comprising:
    an electric motor;
    at least one control device, wherein the electric motor has a first winding, a second winding, and a third winding each connected a single star connection point, wherein the first winding has a first connection point opposite the star connection point, the second winding has a second connection point opposite the star connection point, and the third winding has a third connection point opposite the star connection point, each of the first, second, and third connection points being for a power electronics system of the at least one control device; and
    a first sensor system and a second sensor system for detecting fluid, wherein the first sensor system and the second sensor system are connected to and utilize a single evaluation and control unit,
    wherein the single evaluation and control unit generates a test signal and detects a change in impedance,
    wherein the test signal is an excitation frequency of an oscillatory circuit formed by at least one of the first, second, and third windings and at least one parasitic capacitance between the first, second, and third connection points of the first, second, and third windings under defined conditions,
    wherein the first evaluation and control unit is configured to selectively connect to the first, second, and third connection points or disconnect therefrom, and
    wherein the first evaluation and control unit is connected to the first and second connection points via relays.

* * * * *